July 18, 1967  E. T. VENEMARK  3,331,733
METHOD OF PREPARING POLYSULFIDE-CONTAINING COOKING LIQUOR
Filed Dec. 13, 1963
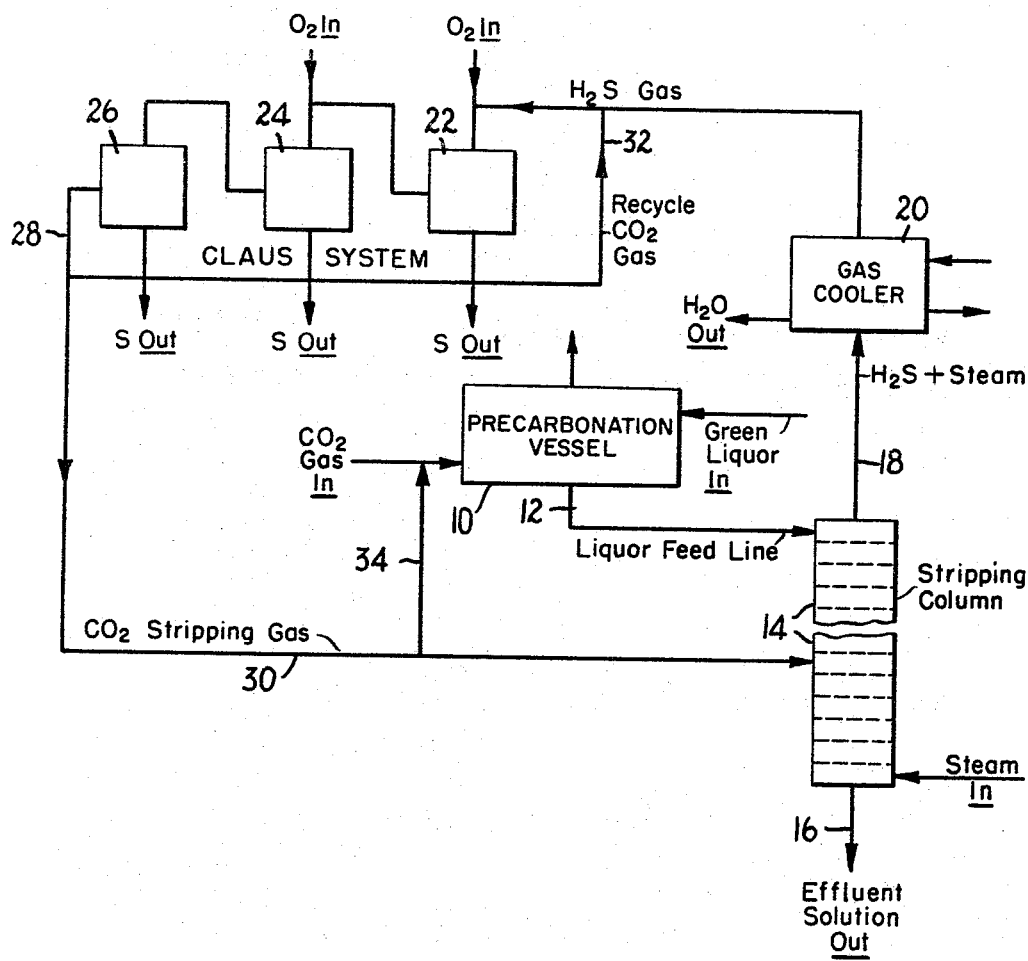

United States Patent Office 3,331,733
Patented July 18, 1967

3,331,733
METHOD OF PREPARING POLYSULFIDE-CONTAINING COOKING LIQUOR
Emil Teodor Venemark, deceased, late of Ornskoldsvik, Sweden, by Rut Venemark, legal representative, Malmo, Sweden, assignor to Mo och Domsjö Aktiebolag, Ornskoldsvik, Sweden, a limited company of Sweden
Filed Dec. 13, 1963, Ser. No. 330,500
Claims priority, application Sweden, Dec. 17, 1962, 13,594/62
6 Claims. (Cl. 162—30)

The present invention relates to cellulose manufacture by the sulfate method and is more particularly concerned with a process in the preparation of a polysulfide-containing cooking liquor.

In the manufacture of cellulose pulp by the sulfate method, it is for economical reasons necessary to recover the alkali from the spent liquor. When cooking with a high proportion of polysulfide in the cooking liquor, which involves great advantages, it is necessary to remove in one way or another a portion of the sulfide of the circulating liquor so that a portion of the sodium sulfide obtained by combustion of the black liquor is converted into free sulfur, which is reused for making sodium polysulfide. In the digestion, a major portion of the polysulfide sulfur is converted into sulfide and thiosulfate and is recovered, apart from any losses, mainly as sulfide in the melt resulting from the combustion of the evaporated residual black liquor.

In the recovery process, it has been found suitable to work up the green liquor, i.e. the solution of sodium sulfide, sodium carbonate and minor amounts of other sodium salts, obtained by dissolving the melt from the combustion of the black liquor. One possible method consists in introducing carbon dioxide in to the green liquor, whereby hydrogen sulfide is obtained, which is subsequently converted into sulfur. Even if the green liquor worked up has previously been enriched on sulfide, a great amount of carbon dioxide is consumed for driving off hydrogen sulfide. A part thereof is consumed to convert the carbonate and the sulfide of the solution into sodium hydrogen carbonate and sodium hydrogen sulfide. If suitable equipment is used, this conversion can be carried very far without any hydrogen sulfide leaving the solution. In the reaction it has been found highly advantageous to use a carbon dioxide gas having a high content of carbon dioxide and obtainable at low cost. The oxygen content of the carbon dioxide gas should also be as low as possible, since sulfide solutions are readily oxidised by oxygen, and this takes place at a rate which becomes higher as the alkalinity of the solution becomes lower.

A sulfate cellulose plant has no source of such carbon dioxide. The present invention is directed to a method of recovering the carbon dioxide used in the step of driving off hydrogen sulfide in a pure state, apart from the presence of hydrogen sulfide.

The method of the present invention comprises driving off hydrogen sulfide by means of carbon dioxide and thereafter partially oxidizing the hydrogen sulfide to form elemental sulfur and water, said oxidation being carried out by the aid of oxygen or oxygen-enriched air, and recirculating the combustion gas, after separation of sulfur, for driving off additional hydrogen sulfide and for diluting the hydrogen sulfide and, if necessary, also to the pretreatment of the solution for converting the sulfide into sodium hydrogen carbonate and sodium hydrogen sulfide.

The figure is a flow sheet of an apparatus for removing hydrogen sulfide from green liquor obtained in the sulfate pulping method and thereafter converting the hydrogen sulfide to sulfur for subsequent use in preparing polysulfide containing cooking liquor for use in the sulfate method of preparing cellulose pulp, in accordance with the instant invention, as carried out in the example, and a description thereof will be found in the example.

The invention is illustrated by the following example.

*Example*

A sulfate cellulose pulping plant produced 20 metric tons of sulfate pulp per hour using a liquor containing 70 kg. of polysulfide sulfur per metric ton of pulp.

A flow sheet showing the apparatus used in removing hydrogen sulfide from the green liquor produced and thereafter converting it to sulfur is given in the figure. The green liquor obtained by dissolving the melt from the combustion of black liquor was pretreated in a vessel 10 with a carbon dioxide containing residual gas obtained in the manner described below flowing through lines 28, 30 and 34, into the vessel 10. Thereby, the hydrogen sulfide and the major portion of the carbon dioxide were removed from the residual gas, which was then discharged to the atmosphere. The pretreated green liquor contained 60 g. $Na_2O$ as sodium hydrogen sulfide and 60 g. $Na_2O$ as sodium hydrogen carbonate as well as 8 g. $Na_2O$ as other sodium salts, per liter of solution, and had a temperature of 70° C. The treated solution was passed via line 12 to a stripping column 14 wherein it was treated stepwise and in countercurrent wa sa gas, obtained as described below, comprising 1% by volume of hydrogen sulfide, 95% by volume of carbon dioxide and 4% by volume of inert gases. The solution was treated at a rate of 0.8 cubic meter per minute thereof. The solution leaving the column via line 16, after the carbon dioxide had been driven off therefrom by steam, had an overall composition corresponding to 5 g. $Na_2O$ as sodium hydrogen carbonate, and 75 g. $Na_2O$ as sodium carbonate, per liter of solution, and a temperature of 100° C. as a result of heating in connection with the carbon dioxide removing step. From the solution entering the column, 25 kg. of hydrogen sulfide were driven off per minute, the effluent gas being practically saturated with steam. The gas leaving the column via line 18 was cooled in a gas cooler 20 to separate the major portion of its water and was mixed with a recycle carbon dioxide containing gas obtained as explained below from the gas furnaces, so that its resulting content of hydrogen sulfide was suitable for combustion. Upon preheating which was largely carried out by heat exchange between and after the steps of the subsequent Claus process, the hydrogen sulfide was burnt in the gas furnaces 22, 24 and 26 in three steps in series with 11 kg. of oxygen gas per minute, said oxygen gas comprising 98% by volme of oxygen and 2% by volume of inert gases, the addition of oxygen being divided on the steps and cooling between them. After combustion the gas was cooled and sulfur separated in a conventional manner. After separation of the sulfur and further cooling to separate water and any small amounts of sulfur oxides present, the major portion of the gas which contained about 1% by volume of hydrogen sulfide and traces of sulfur oxides, was returned to the hydrogen sulfide stripping step via lines 28 and 30 and to dilution prior to the Claus furnaces via lines 28 and 32. The remainder of the gas was used to pretreat the liquor flowing through lines 28, 30 and 34 as described above.

To start the process, pure carbon dioxide from a storage tank or prepared in a conventional way can be used or the installation can be operated with a lime furnace gas, using reduced conversions and amounts so as to build up gradually a pure carbon dioxide.

The above described process of partially oxidizing the hydrogen sulfide with technical oxygen and circulating the carbon dioxide between the oxidizing apparatus and the stripping apparatus is not limited to the use of a Claus

What is claimed is:

1. A process for preparing a polysulfide-containing cooking liquor for use in the sulfate method of preparing cellulose pulp, which comprises stripping hydrogen sulfide from a green liquor containing sodium sulfide and obtained from spent liquor produced in the sulfate pulping method, by introducing a carbon dioxide stripping gas mixture into the green liquor, forming a solution containing sodium carbonate and sodium bicarbonate, converting the hydrogen sulfide to sulfur by burning substantially all the hydrogen sulfide in the carbon dioxide stripping gas mixture with sufficient added oxygen to support the combustion, converting the sulfur to sodium polysulfide, using the sodium polysulfide to prepare a polysulfide-containing pulping liquor for the sulfate pulping method, and recycling the residual carbon dioxide stripping gas mixture as obtained from the hydrogen sulfide combustion for stripping of additional hydrogen sulfide from green liquor.

2. A process in accordance with claim 1, which comprises pretreating the green liquor with such carbon dioxide stripping gas mixture to convert the sodium sulfide into sodium hydrogen sulfide and sodium hydrogen carbonate.

3. A process in accordance with claim 1, in which the hydrogen sulfide conversion is carried out in at least two steps, adding oxygen in each step, and cooling the gas mixture between the steps.

4. A process in accordance with claim 1, in which the burning of hydrogen sulfide is effected in a gas mixture deficient in oxygen, resulting in a residual carbon dioxide stripping gas mixture low in oxygen-containing gases.

5. A process in accordance with claim 1 in which the residual carbon dioxide stripping gas mixture obtained after the hydrogen sulfide conversion contains residual hydrogen sulfide, and is recycled with such hydrogen sulfide content.

6. A process in accordance with claim 1 in which the residual carbon dioxide stripping gas mixture obtained after the hydrogen sulfide conversion contains residual hydrogen sulfide, and is recycled to the hydrogen sulfide burning step.

References Cited

UNITED STATES PATENTS

| | | | |
|---|---|---|---|
| 2,594,149 | 4/1952 | Gamson | 23—225.1 |
| 2,824,071 | 2/1958 | Gray et al. | 23—48 X |
| 2,849,292 | 8/1958 | Shick | 23—181 X |
| 2,909,407 | 10/1959 | Ahlborg et al. | 23—225 X |
| 2,919,976 | 1/1960 | Feagan | 23—225 |
| 3,005,686 | 10/1961 | De Haas | 23—49 X |
| 3,079,238 | 2/1963 | Handwerk | 23—181 X |
| 3,098,710 | 7/1963 | Ahlborg et al. | 23—49 X |

OSCAR R. VERTIZ, *Primary Examiner.*

G. OZAKI, *Assistant Examiner.*